US007856596B2

(12) United States Patent
Crider et al.

(10) Patent No.: US 7,856,596 B2
(45) Date of Patent: Dec. 21, 2010

(54) METHOD AND SYSTEM FOR SEPARATION OF CONTENT AND LAYOUT DEFINITIONS IN A DISPLAY DESCRIPTION

(75) Inventors: Michael P. Crider, Redmond, WA (US); Igor Zaika, Kirkland, WA (US); Matthew R. Labarge, Toronto (CA)

(73) Assignee: Microsoft Corporation, Redmond, WA (US)

( * ) Notice: Subject to any disclaimer, the term of this patent is extended or adjusted under 35 U.S.C. 154(b) by 1129 days.

(21) Appl. No.: 10/780,547

(22) Filed: Feb. 17, 2004

(65) Prior Publication Data

US 2005/0183008 A1 Aug. 18, 2005

(51) Int. Cl.
*G06F 17/00* (2006.01)

(52) U.S. Cl. ........................ 715/243; 715/205; 715/234

(58) Field of Classification Search ................ 715/513, 715/517, 523, 526, 200, 204, 229, 234, 243, 715/248, 251, 273, 274
See application file for complete search history.

(56) References Cited

U.S. PATENT DOCUMENTS

| | | | | |
|---|---|---|---|---|
| 5,475,805 | A * | 12/1995 | Murata | 715/513 |
| 5,895,476 | A * | 4/1999 | Orr et al. | 715/202 |
| 5,903,902 | A * | 5/1999 | Orr et al. | 715/517 |
| 5,956,737 | A * | 9/1999 | King et al. | 715/517 |
| 6,230,173 | B1 | 5/2001 | Ferrel et al. | |
| 6,381,740 | B1 * | 4/2002 | Miller et al. | 717/151 |
| 6,476,828 | B1 * | 11/2002 | Burkett et al. | 715/760 |
| 6,639,611 | B1 * | 10/2003 | Leduc | 715/764 |
| 6,707,476 | B1 * | 3/2004 | Hochstedler | 715/789 |
| 6,785,866 | B1 * | 8/2004 | Lewis et al. | 715/209 |
| 6,826,727 | B1 * | 11/2004 | Mohr et al. | 715/235 |
| 6,928,610 | B2 * | 8/2005 | Brintzenhofe et al. | 715/202 |
| 6,993,711 | B1 * | 1/2006 | Tanaka et al. | 715/513 |
| 7,039,863 | B1 * | 5/2006 | Caro et al. | 715/209 |
| 7,051,276 | B1 * | 5/2006 | Mogilevsky et al. | 715/517 |
| 7,085,999 | B2 * | 8/2006 | Maeda et al. | 715/236 |
| 7,107,525 | B2 * | 9/2006 | Purvis | 715/244 |
| 7,120,868 | B2 * | 10/2006 | Salesin et al. | 715/517 |
| 7,246,311 | B2 * | 7/2007 | Bargeron et al. | 715/251 |

(Continued)

FOREIGN PATENT DOCUMENTS

EP 0 774 722 5/1997

OTHER PUBLICATIONS

C. Jacobs et al., "Adaptive Grid-Based Document Layout", Microsoft Research, ACM, Jul. 2003, pp. 838-847.*

(Continued)

*Primary Examiner*—Laurie Ries
*Assistant Examiner*—Maikhanh Nguyen
(74) *Attorney, Agent, or Firm*—Perkins Coie LLP

(57) ABSTRACT

A method and system for specifying alternate layouts of a user interface element of a display description is provided. In one embodiment, a display system provides a display description language that separates the definition of content of a user interface element from the layout of the user interface element. This separation allows alternate layouts to be specified that are conditionally applied to content of the user interface element without having to repeat the content. In another embodiment, the display system allows each element of a table to be positioned within a specific cell within the table.

19 Claims, 9 Drawing Sheets display element
701 retrieve attributes & style attributes
702 layout children
712 layout children (value)
709 table position
719 table position
720 render object
721 select next child
722 all already selected
Y return
N
723 display element (child)

U.S. PATENT DOCUMENTS

| | | | | |
|---|---|---|---|---|
| 7,272,789 | B2 * | 9/2007 | O'Brien | 715/517 |
| 7,362,311 | B2 * | 4/2008 | Filner et al. | 345/169 |
| 2001/0014900 | A1 * | 8/2001 | Brauer et al. | 707/513 |
| 2002/0156815 | A1 * | 10/2002 | Davia | 707/517 |
| 2002/0188632 | A1 * | 12/2002 | Su | 707/513 |
| 2003/0184585 | A1 * | 10/2003 | Lin et al. | 345/763 |
| 2003/0225853 | A1 * | 12/2003 | Wang et al. | 709/217 |

OTHER PUBLICATIONS

J. Bateman et al., "Towards Constructive Text, Diagram, and Layoutout Generation for Information Presentation", Association for Computational Linguistics, 2001, pp. 409-449.*

S. Feiner, "A Grid-Based Approach to Automating Display Layout", In Proceedings of Graphics Interface'88, pp. 249-254.*

K. Gajos et al., "Supple: Automatically Generating User Interfaces", ACM, Jan. 2004, pp. 1-8.*

W3C, "Positioning HTML Elements with Cascading Style Sheets," Aug. 19, 2007, pp. 1-14, Retrieved from the Internet <http://www.w3.org/TR/NOTE-layout>.*

T. Shih et al., "A Stepwise Refinement Approach to Multimedia Presentation Designs", IEEE, Oct. 1997, pp. 117- 122.*

FrontPage 11 Beta Layperson's Specification, Copyright 2002, Microsoft Corporation, 12 pages.*

Khare, Rohit and Rifkin, Adam, "The Origin of (Document) Species," University of California, 1998 (9 pages).

"Separate Structure and Presentation," http://www.webreference.com/html/tutorial5/1.html, Aug. 20, 1998 (4 pages).

"The Style Attribute and CSS Declarations," http://www.webreference.com/html/tutorial5/2, Aug. 20, 1998 (4 pages).

http://www.webreference.com/html/tutorial5/3.html, Aug. 20, 1998 (3 pages).

"The Style Element & CSS Selectors," http://www.webreference.com/html/tutoria15/4, Aug. 20, 1998 (3 pages).

http://www.webreference.cm/html/tutorial5/5.html, Aug. 20, 1998 (3 pages).

"ID & Class Selectors, Pseudoclsses," http://www.webreference.com/html/tutorial5/6 html, Aug. 20, 1998 (3 pages).

http://www.webreerence.com/htmI/tutorial5/7.html, Aug. 20, 1998 (3 pages).

http://www.webreference.com/html/tutorial5/8/html, Aug. 20, 1998 (2 pages).

"External Style Sheets," http://www.webereference.com/html/tutorial5/10.html, Aug. 20, 1998 (3 pages).

Raman, T.V., "Cascaded Speech Style Sheets," 1997 (9 pages).

Raman, T.V., "Cascaded Speech Style Sheets," Advanced Technology Group, 1997 (9 pages).

* cited by examiner

METHOD AND SYSTEM FOR SEPARATION OF CONTENT AND LAYOUT DEFINITIONS IN A DISPLAY DESCRIPTION

TECHNICAL FIELD

The described technology relates to specifying display descriptions using a display description language.

BACKGROUND

Many display descriptions, such as web page definitions, are specified using display description languages such as HTML, XML, or other markup language. These display description languages are declarative in the sense that they allow a programmer to specify the content of the display without specifying the procedure for rendering the content. For example, a display description language may allow a developer to specify that a table is to be displayed at a certain location and to specify the content of the cells within the table without having to specify the steps needed to render the table. A rendering engine is responsible for performing the rendering in accordance with the display description. For example, an HTML rendering engine inputs an HTML document that may define the content of a web page and renders the web page.

Although declarative display description languages are highly readable, they have some disadvantages over programs written in procedural languages specifically to render content in a certain layout. In particular, the declarative display descriptions often have a greater level of repetitiveness than procedural programs. For example, the content or attributes of the same user interface element (e.g., a table) may need to be repeated several times in a display description to accommodate different characteristics of the output device. This repetition increases the cost of both developing and maintaining the user interface and reduces readability.

Several techniques are commonly used to reduce repetition in declarative display descriptions. One such technique uses "styles" to define various attributes at a common location that can be applied to the content of various user interface elements of the display description. For example, a style may be defined that specifies that hyperlinks of a certain class are to be rendered in red. Another style may be defined that specifies that hyperlinks of another class are to be rendered in green. When a rendering engine encounters a hyperlink, it retrieves the style for the hyperlink's class and renders the hyperlink with the appropriate color. Styles may even allow the use of conditional logic. For example, a style may specify that a class of hyperlinks is to normally have the color red, but when a mouse pointer is hovering over that hyperlink, its color is to change to green. An alternative to the use of styles would be to have a color attribute and color attribute selection logic specified for each hyperlink element. Styles have an advantage over this alternative in that when a color or color logic for a class of hyperlinks is modified, only the style for that class needs to be modified, rather than each hyperlink element. Another advantage is that the display description is more readable when the individual user interface elements are not cluttered with attributes and logic.

These common techniques, however, do not provide a good way to vary the layout of content conditionally. For example, a window pane may need to have its layout varied depending on whether it is docked on the left or bottom of a display device. When the window pane is docked on the left, its content should be arranged vertically, and when the window pane is docked on the bottom, its content should be arranged horizontally. In addition, the layout of the user interface elements may be conditional upon the size and shape of the display device itself. For example, the layout of user interface elements of a web page to be rendered on a 17-inch display device would likely be very different from that of a 3-inch display device. When specified using a declarative display description language, these conditional layouts are typically generated statically or dynamically. A statically generated display description is generated once and contains multiple copies of the content and the attributes of a user interface element for each possible layout of that element. A dynamically generated declarative display description is generated after the characteristics of the display device are known, using a program or an XML transform. The statically generated declarative display description has the disadvantage of repetition, whereas the dynamically generated declarative display description has the disadvantages of being less readable and more difficult to update, especially if the display logic is in a program.

Display description 1 illustrates an example HTML-like display description that defines the layout of a table user interface element differently depending on whether it is docked on the left or bottom of a display device. In this example, the specification of the content and attributes of the table needs to be repeated in order to accommodate the different layouts. FIG. 1 illustrates example renderings of this display description. Table 101 represents the table layout when it is docked on the left, and table 102 represents the table layout when it is docked to the bottom. As can be seen from the display description, the layout of the content of the table is specified by the ordering of the content in the display description and the placement of various tags. In particular, <TR> and <TD> define the layout of the content within the rows of the table. A developer would need to remove <TD> tags to change the layout of the content of the first row of table 101 from vertical to horizontal. Thus, the definition of the content and the specification of its layout are integrated and dependent on each other in the sense that the definition of the content would need to be modified (e.g., moved around) when the tags specifying the layout are modified. In addition, any change to the content of the table would need to be made in both repetitions of the table.

Display Description 1

```
<if docked == left>
  <Table >
    <TR>
      <TD>
        <Table>
          <TR><TD>A1</TD></TR>
          <TR><TD>A2</TD></TR>
          <TR><TD>A3</TD></TR>
        </Table>
      </TD>
    </TR>
    <TR>
      <TD>
        <Table>
          <TR><TD>B1</TD><TD>B2</TD><TD>B3</TD></TR>
        </Table>
      </TD>
    </TR>
  </Table>
</if>
<if docked == bottom>
  <Table>
    <TR>
      <TD>
```

-continued

Display Description 1

```
      <Table>
        <TR><TD>B1</TD><TD>B2</TD><TD>B3</TD></TR>
      </Table>
    </TD>
    <TD>
      <Table>
        <TR><TD>A1</TD><TD>A2</TD></TR><TD>A3
        </TD></TR>
      </Table>
    </TD>
  </TR>
</Table>
</if>
```

It would be desirable to have a technique for specifying variations in the layout of user interface elements that would reduce repetition and still be highly readable.

SUMMARY

A method and system for separating the definition of a user interface element from a specification of the layout of the content of the user interface element is provided. The definition of the content and the specification of its layout are specified in a display description using a display description language. In one embodiment, a display description provides a definition of an element and at least two condition and layout pairs. When processing the definition of the element, a display system displays the element in accordance with the layout of the condition and layout pair whose condition is satisfied.

DETAILED DESCRIPTION

Figure 1:
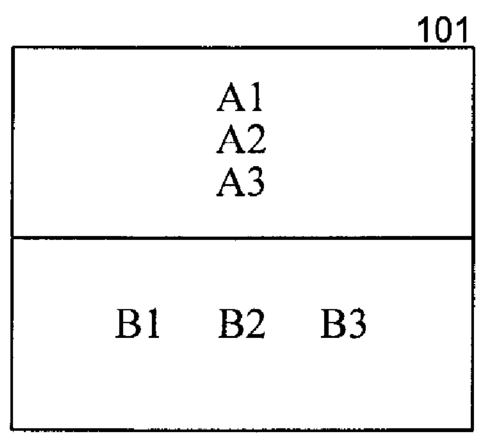
FIG. 1 illustrates example layouts of a display description.
Figure 1:
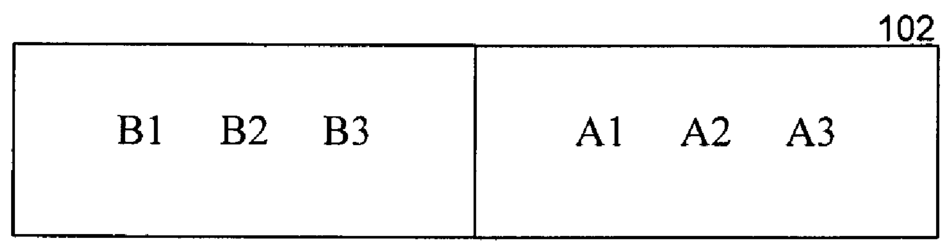

A method and system for specifying alternate layouts of a user interface element of a display description is provided. In one embodiment, a display system provides a display description language that separates the definition of content of a user interface element from the specification of layout of the user interface element. Because of this separation, the definition of content can be independent from the specification of its layout. For example, the layout of a window pane can be specified by a layout attribute with a value specifying that the content is to be laid out horizontally. Without rearranging or changing the ordering of the content or without adding or moving tags, the layout can be changed by changing the value of the layout attribute to specify that the content is to be laid out vertically (i.e., changing the specification of the layout). This separation allows alternate layouts to be specified that are conditionally applied to content of the user interface element without having to repeat the content. For example, a window pane can be defined by a content element that has child content elements representing the content of the window pane. The layout can be specified in a style element for a window pane class of user interface elements. The style element may conditionally specify that when the window pane is docked on the bottom, then a horizontal layout of the child content elements is to be used and that when the window pane is docked on the left, then a vertical layout of the child content elements is to be used. Alternatively, the conditional layout can be specified by attributes within the definition of content of the user interface element, but still not affect the definition of the content itself. Because the child content elements are only defined once even though they can be laid out vertically or horizontally, the repetition of the child content elements is avoided, which simplifies initial development and ongoing maintenance of display descriptions.

In another embodiment, the display system allows each element of a table to be positioned within a specific cell within the table. Each element of a table may have a position attribute that specifies a row and column of a cell within the table. When the table is displayed, the display system positions the child content elements in the cells in accordance with their position attributes. The position attributes may also be separated from the content of the user interface elements and specified as conditional attributes of the content element or as conditional attributes of a style element. Thus, the developer of a display description can position elements of a table in a specific cell without having to rely on the ordering of the elements in the definition of the content. In addition, alternate layouts can be specified in which the position of an element can be varied based on where the table is positioned on the display device, the dimensions of the table, other characteristics of the table, or other characteristics that may not be directly related to the table.

Display description 2 illustrates use of conditional layout and positioning within a table when defining the tables of FIG. 1. The display description includes style elements that specify the alternate layouts, and content elements that define the content of the table. Style elements 1.1, 1.2, and 1.3 specify the layouts for their corresponding content elements when the table is docked on the left. Style element 1.1 specifies that the content element with the identifier of "table 1" is to have its child elements laid out as a table with one column and two rows. Style element 1.2 specifies that the content element with the identifier of "A" is positioned within its parent's table in row 1 and column 1 and that any child content elements are to be laid out vertically. Style element 1.3 specifies that the content element with the identifier of "B" is to be positioned within its parent's table in row 2 and column 1 and that any child content elements are to be laid out horizontally. Style elements 1.4, 1.5, and 1.6 specify the layouts for their corresponding content elements when the table is docked on the bottom. Style element 1.4 specifies that the content element with the identifier of "table 1" is to have its child content elements laid out as a table with two columns and one row. Style element 1.5 specifies that the content element with the identifier of "A" is to be positioned within its parent's table in row 1 and column 2 and that any child content elements are to be laid out horizontally. Style element 1.6 specifies that the content element with the identifier of "B" is to be positioned within its parent's table in row 1 and column 1 and that any child content elements are to be laid out horizontally.

The content elements are defined as content element 2 and its child content elements 2.1 and 2.2. Content element 2 has the identifier of "table 1." Content element 2.1 has the identifier of "A" and contains three child content elements that are labels with the content "A1," "A2," and "A3." Content element 2.2 has the identifier of "B" and contains three child content elements that are labels with the content "B1," "B2," and "B3."

When the display system renders display description 2, it first determines which style elements have their conditions satisfied depending on where the table is docked. The display system then processes the content elements. If the table is docked on the left, then style elements 1.1, 1.2, and 1.3 will have their conditions satisfied and style elements 1.4, 1.5, and 1.6 will not. When the display system renders content element 2, it retrieves style element 1.1 because its condition is satisfied and its identifier matches that of content element 2. The display system then generates a table having one column and two rows in accordance with style element 1.1. The display system then processes the child content elements 2.1 and 2.2. When processing content element 2.1, the display system applies style element 1.2 because its condition is satisfied and its identifier matches that of content element 2.1. The style element 1.2 specifies the position of row 1 and column 1 of its parent table and that its content "A1," "A2," and "A3" is to be laid out vertically within that position of the table. When the display system processes the content element 2.2, the display system applies style element 1.3 because its condition is satisfied and its identifier matches that of content element 2.2. Style element 1.3 specifies the position of row 2 and column 1 within its parent's table and that its content "B1," "B2," and "B3" is to be laid out horizontally within that position of the table. The layout of the resulting table will be that of table 101 of FIG. 1. When the table is docked on the bottom, the style elements 1.4, 1.5, and 1.6 will have their conditions satisfied and the resulting table will be that of table 102 of FIG. 1.

Display Description 2

```
1       <Style>
1.1         <Element id="table 1" condition="docked==left"
                layoutChildren="table"
                cols="1"
                rows="2"/>
1.2         <Element id="A" condition="docked==left"
                tablePosition="1,1"
                layoutChildren="vertical"/>
1.3         <Element id="B" condition="docked==left"
                tablePosition="2,1"
                layoutChildren="horizontal"/>
1.4         <Element id="table 1" condition="docked==bottom"
                cols="2"
                rows="1"/>
1.5         <Element id="A" condition="docked==bottom"
                tablePosition="1,2"
                layoutChildren="horizontal"/>
1.6         <Element id="B" condition="docked==bottom"
                tablePosition="1,1"
                layoutChildren="horizontal"/>
        </Style>
2       <Element id="table 1">
2.1         <Element id="A" >
                <Label text="A1"/>
                <Label text="A2"/>
                <Label text="A3"/>
            </Element>
2.2         <Element id="B" >
```

-continued

Display Description 2

```
                <Label text="B1"/>
                <Label text="B2"/>
                <Label text="B3"/>
            </Element>
        </Element>
```

The layout can also be specified as attributes of the content elements themselves. For example, rather than having a style for the content element with the identifier of "A," the content element can be defined as follows:

```
<Element (condition="docked==left"
            tablePosition="1,1"
            layoutChildren="vertical")
        (condition="docked==bottom"
            tablePosition="1,2"
            layoutPosition="horizontal")>
    <Label text="A1"/>
    <Label text="A2"/>
    <Label text="A3"/>
</Element>
```

The adding of layout attributes to a content element may be useful when the layout applies to only one content element and not a class of content elements.

The following table defines various attributes that can be used to specify the layout of a content element in one embodiment. One skilled in the art will appreciate that other attributes may be defined to specify other desired characteristics such as spacing within the layout. For example, attributes can be defined to specify margins, justifications, indentations, and so on.

| Attribute | Description |
| --- | --- |
| Direction | One of {auto\|LTR\|RTL}; sets the direction of flow (e.g., left-to-right). |
| LayoutChildren | Specifies the layout of the child elements of this element. |
| TablePosition | Specifies where this element is positioned within a table layout. |
| Cols | Integer; specifies the number of columns in a table. |
| Rows | Integer; specifies the number of rows in a table. |

Figure 2:
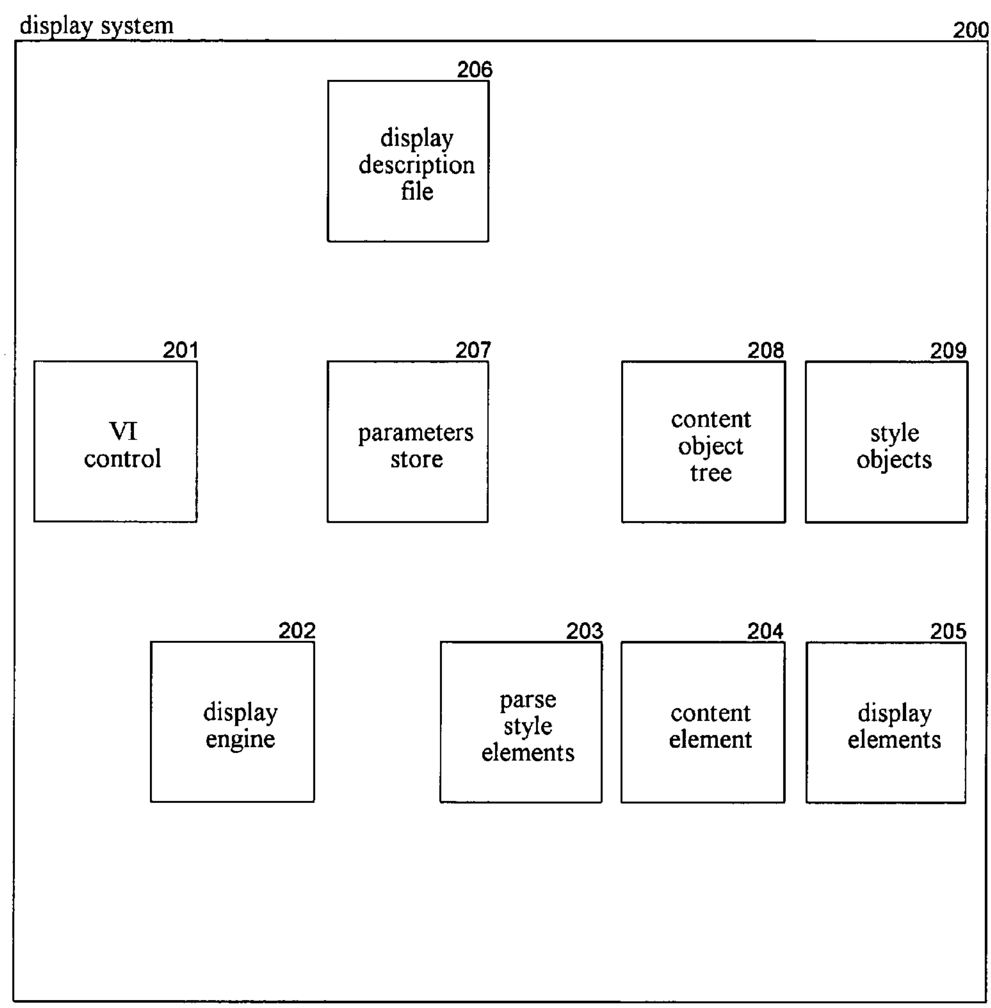
FIG. 2 is a block diagram illustrating components of the display system in one embodiment.

FIG. 2 is a block diagram illustrating components of the display system in one embodiment. The display system 200 includes a UI control component 201, a display engine 202, a parse style elements component 203, a parse content element component 204, and a display elements component 205. The UI control component coordinates the receiving of user input and the rendering of output. The UI control component sets various parameters in a parameter store 207, such as whether the user selected to dock a window pane on the left or bottom. The display engine controls the rendering of content in accordance with the display description file 206. The display engine invokes the parse style elements component, the parse content element component, and the display elements component to parse the display description file and to display the content elements. The parse style elements component creates a style object in memory 209 for each style element in the display description file. A style object contains the attributes of the corresponding style element including condition. The parse content element component creates a tree of content objects in memory 208 corresponding to the tree of content elements defined by the display description file. When the display elements component renders the content, it evaluates the condition of each style object and renders the content in accordance with the content objects of the tree based on which style objects have their conditions satisfied.

The display system may be implemented on computer systems that include a central processing unit, memory, input devices (e.g., keyboard and pointing devices), output devices (e.g., display devices), and storage devices (e.g., disk drives). The memory and storage devices are computer-readable media that may contain instructions that implement the display system. In addition, the data structures and message structures may be stored or transmitted via a data transmission medium, such as a signal on a communications link. Various communications links may be used, such as the Internet, a local area network, a wide area network, or a point-to-point dial-up connection.

FIG. 2 illustrates an example of a suitable operating environment in which the display system may be implemented. The operating environment is only one example of a suitable operating environment and is not intended to suggest any limitation as to the scope of use or functionality of the display system. Other well-known computing systems, environments, and configurations that may be suitable for use include personal computers, server computers, hand-held devices, cell phones, personal digital assistants, laptop devices, multiprocessor systems, microprocessor-based systems, programmable consumer electronics, network PCs, minicomputers, mainframe computers, distributed computing environments that include any of the above systems or devices, and the like.

The display system may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Figure 3:
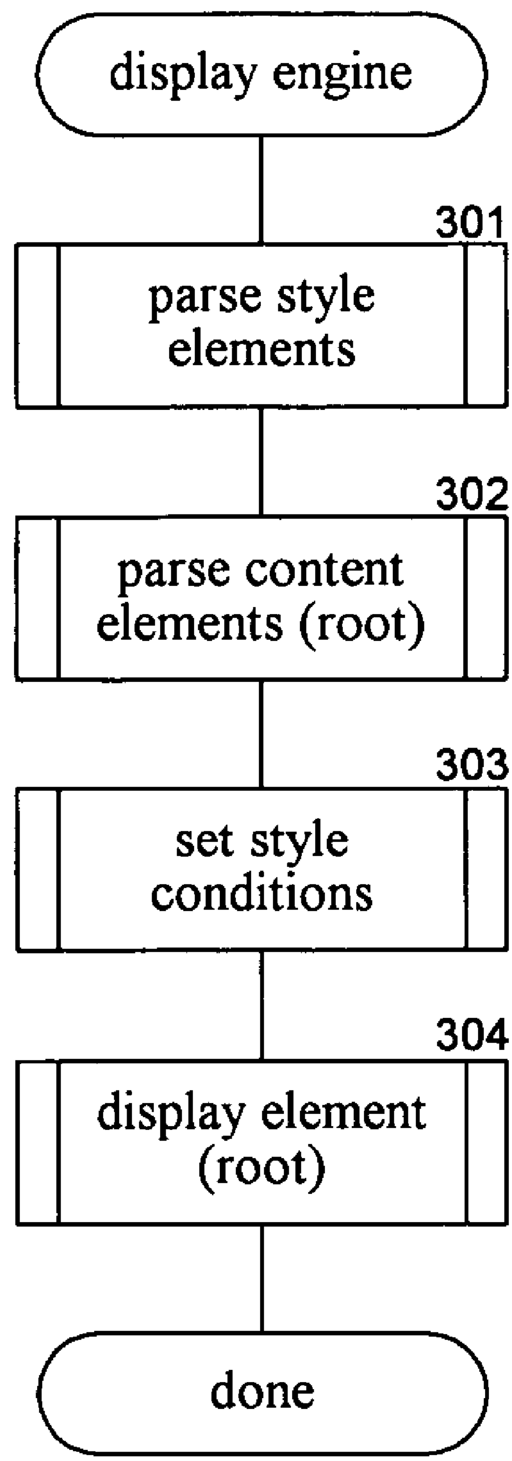
FIG. 3 is a flow diagram illustrating the processing of the display engine in one embodiment.

FIG. 3 is a flow diagram illustrating the processing of the display engine in one embodiment. In block 301, the display engine invokes the parse style elements component passing an indication of the main style element (e.g., marked with the "style" tag) within the display description file. In block 302, the engine invokes the parse content element component passing an indication of the root content element of the display description file. In block 303, the component invokes the set style condition component to evaluate the conditions of the style object based on the parameter store. In block 304, the component invokes the display elements component passing the root content object of the content object tree. The component then completes.

Figure 4:
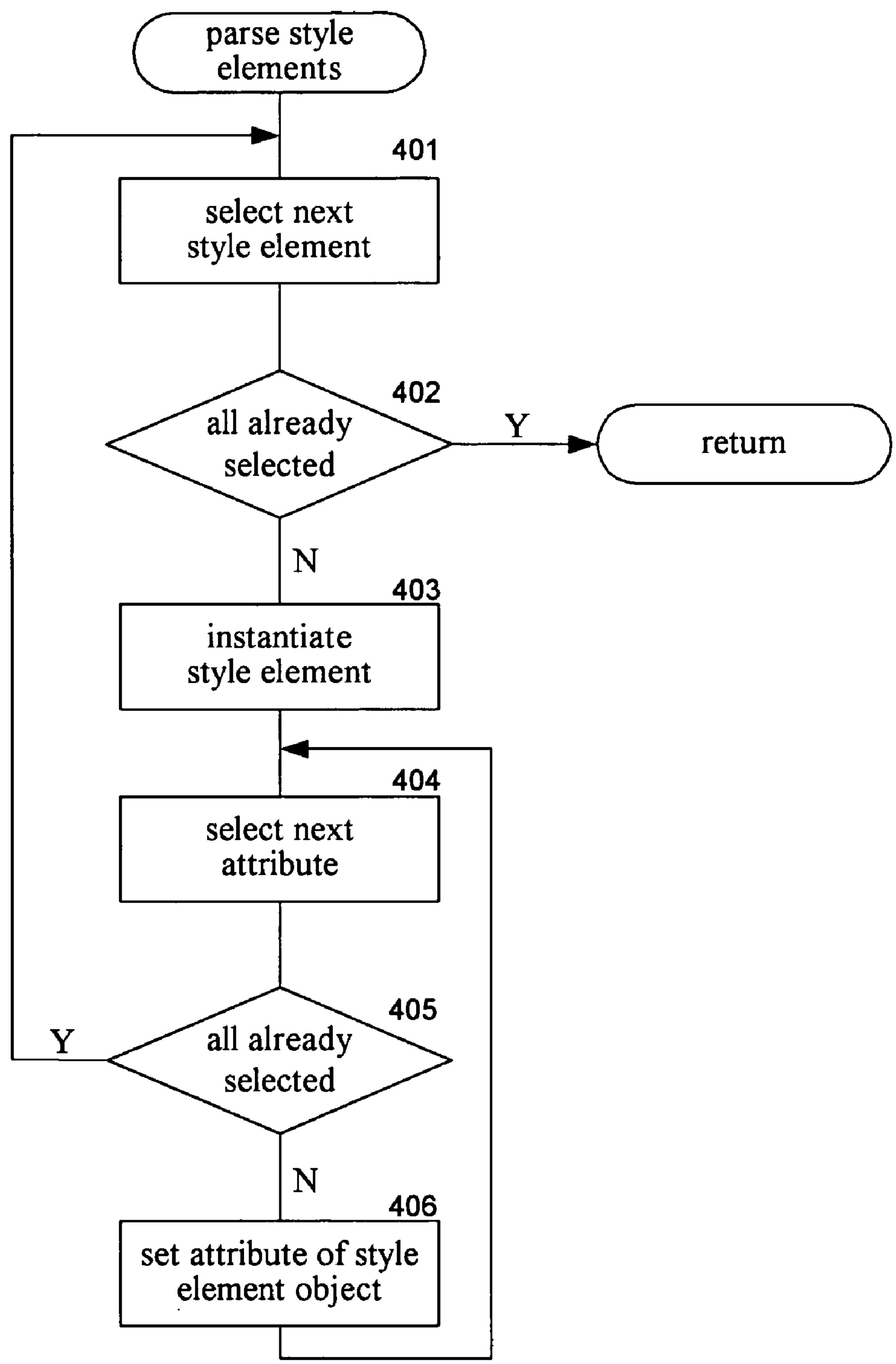
FIG. 4 is a flow diagram illustrating the processing of the parse style elements component in one embodiment.

FIG. 4 is a flow diagram illustrating the processing of the parse style elements component in one embodiment. The component is passed a style. The component loops processing each style element within the style. In block 401, the component selects the next style element. In decision block 402, if all the style elements have already been selected, then the component returns, else the component continues at block 403. In block 403, the component instantiates a style object for the selected style element. In blocks 404-406, the component loops setting the attributes of the style object. In block 404, the component selects the next attribute of the selected style element. In decision block 405, if all the attributes have already been selected, then the component loops to block 401 to select the next style element, else the component continues at block 406. In block 406, the component sets the attribute of the style object and then loops to block 404 to select the next attribute.

Figure 5:
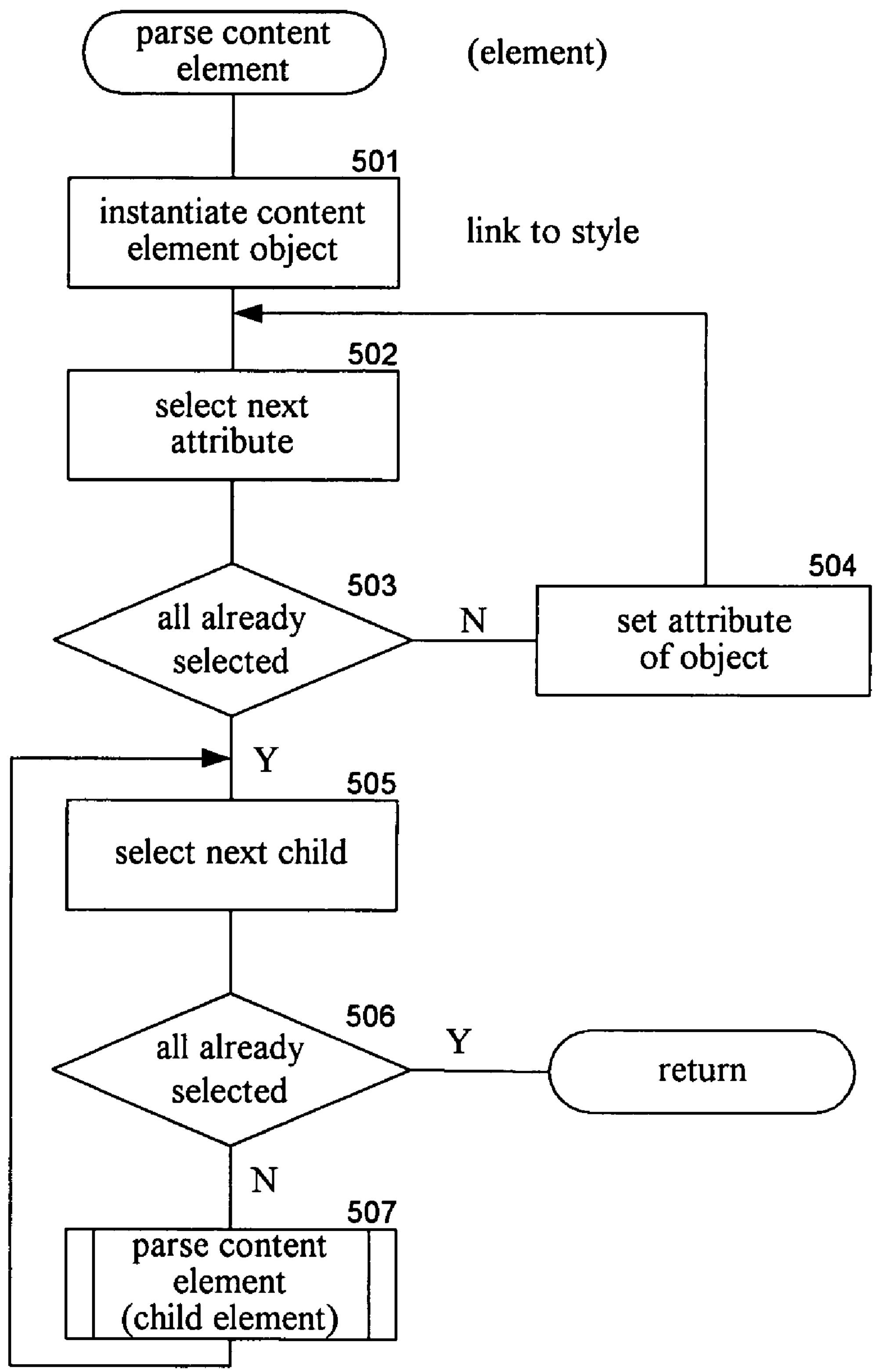
FIG. 5 is a flow diagram illustrating the processing of the parse content element component in one embodiment.

FIG. 5 is a flow diagram illustrating the processing of the parse content element component in one embodiment. The component is passed a content element and parses it. The component instantiates a content object for the passed element and then recursively invokes the component for each content child element. In block 501, the component instantiates a content object for the passed content element. The content object may contain a reference to its corresponding style object, if any, so that the condition and attributes can be retrieved from it when output is being generated. In blocks 502-504, the component loops setting the attributes of the instantiated content object. In block 502, the component selects the next attribute of the passed content element. In decision block 503, if all the attributes have already been selected, then the component continues at block 505, else the component continues at block 504. In block 504, the component sets the attribute of the content object and then loops to block 502 to select the next attribute. In blocks 505-507, the component loops parsing each child content element. In block 505, the component selects the next child content element of the passed element. In decision block 506, if all the child content elements have already been selected, then the component returns, else the component continues at block 507. In block 507, the component recursively invokes the parse content element component passing the selected child content element and then loops to block 505.

Figure 6:
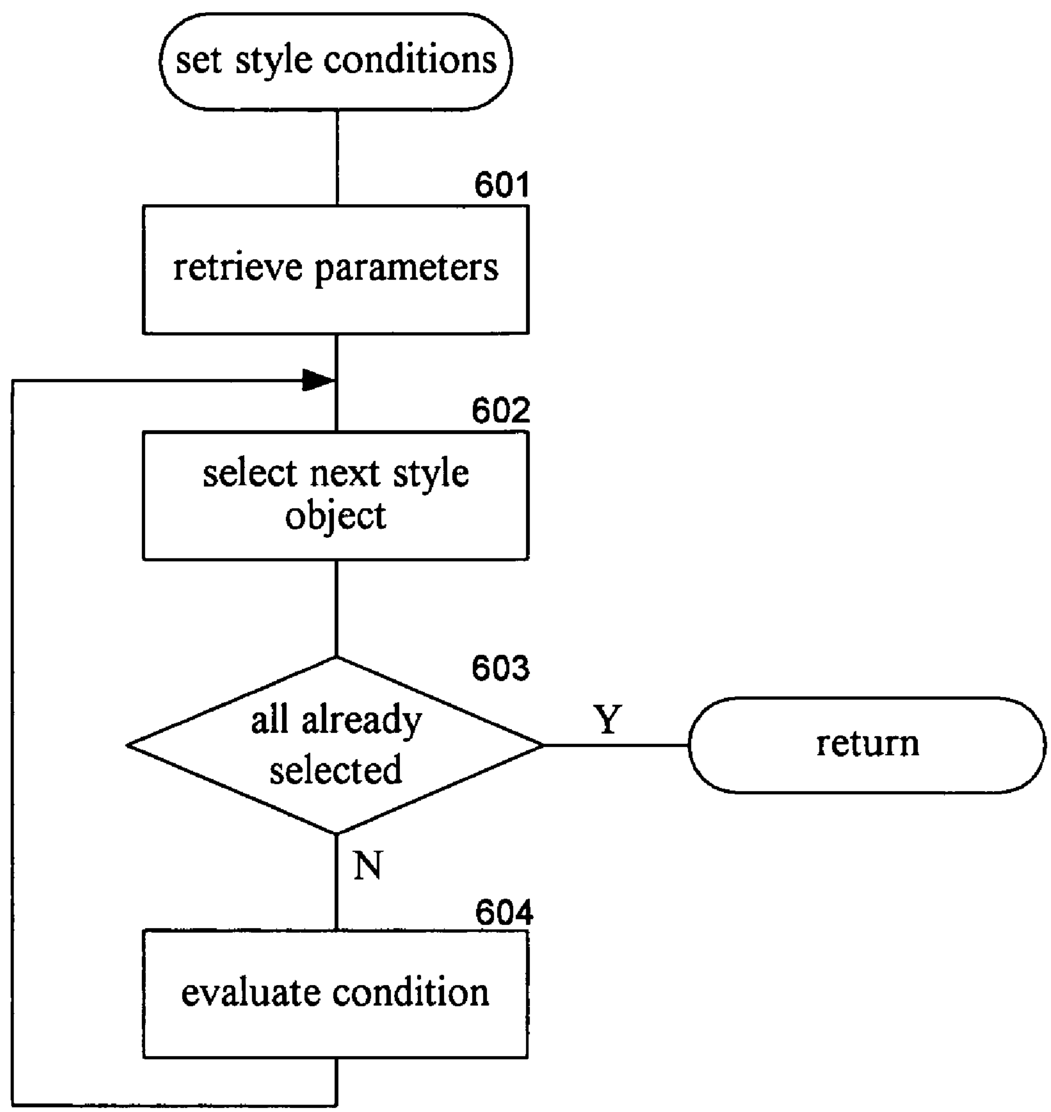
FIG. 6 is a flow diagram illustrating the processing of a set style condition component in one embodiment.

FIG. 6 is a flow diagram illustrating the processing of a set style condition component in one embodiment. The component evaluates the condition of each style object. In block 601, the component retrieves the parameters from the parameter store. In block 602, the component selects the next style object in memory. In decision block 603, if all the style objects have already been selected, then the component returns, else the component continues at block 604. In block 604, the component evaluates the condition of the selected style object based on the retrieved parameters and then loops to block 602 to select the next style object.

Figure 7:
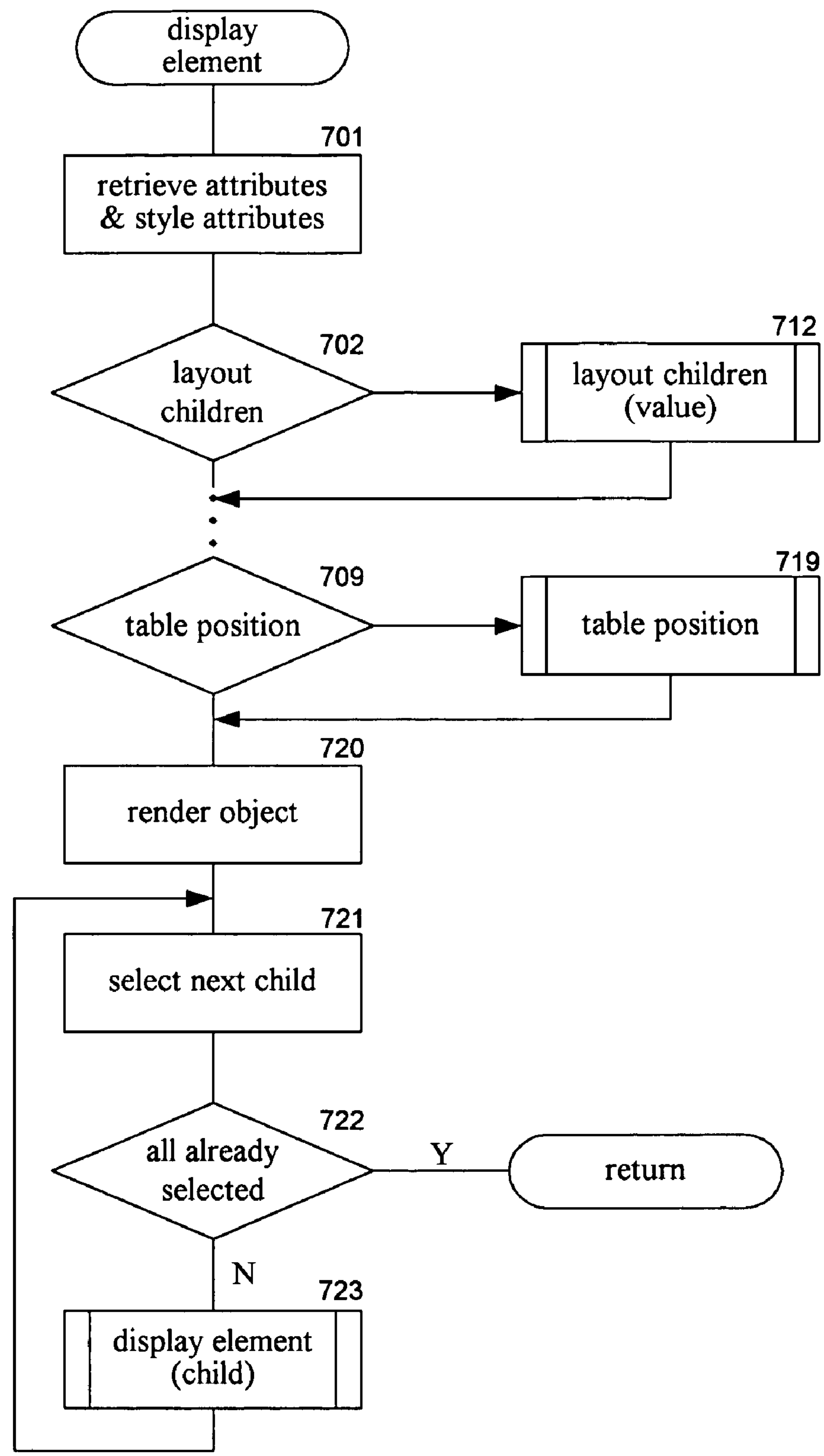
FIG. 7 is a flow diagram illustrating the processing of the display content element component in one embodiment.

FIG. 7 is a flow diagram illustrating the processing of display element component in one embodiment. The component renders content of the passed content element in accordance with its attributes and stores additional information for rendering of content of child content elements. The component may be recursively invoked for each child content element. In block 701, the component retrieves the attributes of the content object including the attributes associated with a style object or inherited from a parent content object. In decision blocks 702-709, the component determines whether the content object has various attributes and, if so, invokes the appropriate component for processing in blocks 712-719. For example, in decision block 702, if the layoutChildren attribute has been specified, then the component invokes the layoutChildren component in block 712 passing the value of that attribute. In block 720, the component renders the content associated with the content object and then proceeds to render its child objects. In block 721, the component selects the next child content object. In decision block 722, if all the child content objects have already been selected, then the component returns, else the component continues at block 723. In block 723, the component recursively invokes this component passing the selected child content object and then loops to block 721 to select the next child content object.

Figure 8:
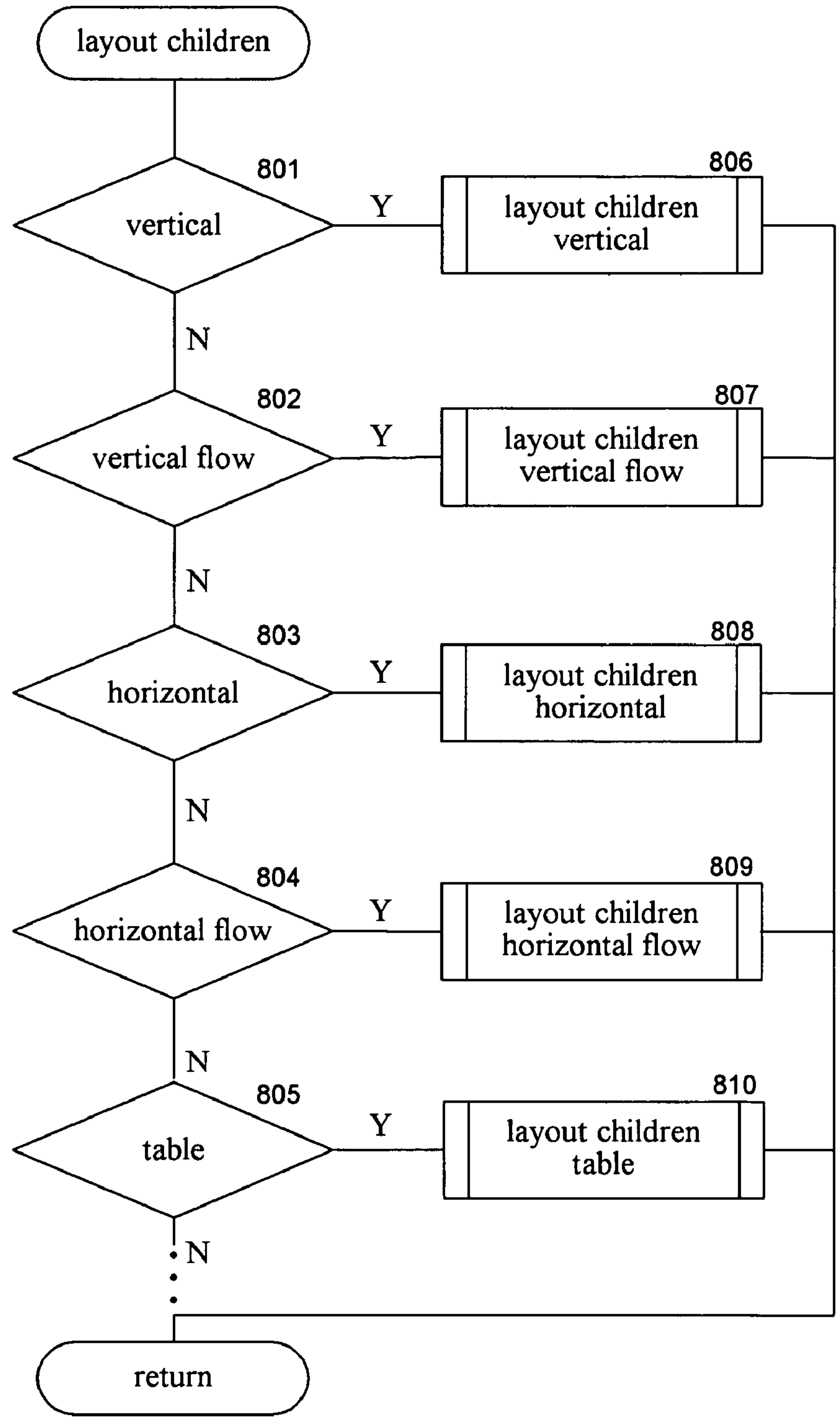
FIG. 8 is a flow diagram illustrating the processing of a layoutChildren component in one embodiment.

FIG. 8 is a flow diagram illustrating the processing of a layoutChildren component in one embodiment. The layoutChildren component is an example of the processing associated with one type of attribute. In blocks 801-805, the component identifies the value specified by the layoutChildren attribute. In blocks 806-810, the component invokes the appropriate component for processing the content object in accordance with the attribute value. The component then returns.

Figure 9:
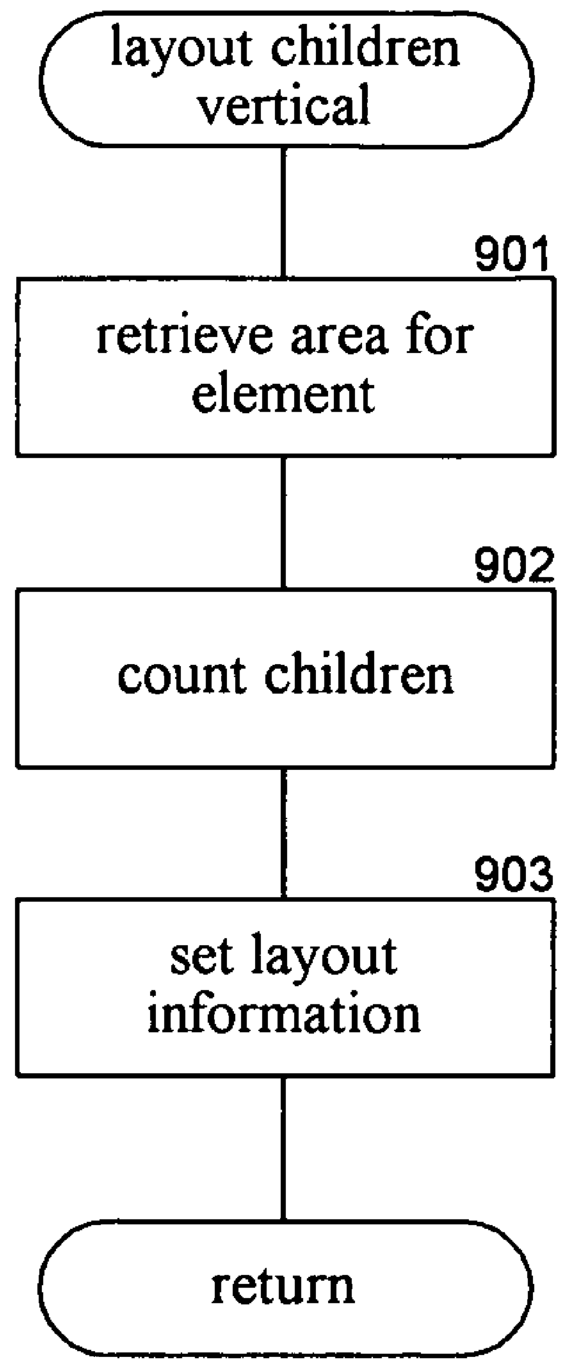
FIG. 9 is a flow diagram illustrating the processing of the layoutChildrenVertical component in one embodiment.

FIG. 9 is a flow diagram illustrating the processing of the layoutChildrenVertical component in one embodiment. This component is invoked when a content object has a layoutchildren attribute with the value of vertical. This component is passed an indication of the content object. In block 901, the component retrieves the area for the content object for display. In block 902, the component determines how many child content objects this content object has. In block 903, the component sets information needed to render the content object based on the value of this attribute being vertical. For example, the component may calculate the area for the content object based on the area of its siblings or reset areas of its siblings. The component then returns.

From the foregoing, it will be appreciated that specific embodiments of the invention have been described herein for purposes of illustration, but that various modifications may be made without deviating from the spirit and scope of the invention. The display system may allow some child elements of a table to be positioned at specific cells within the table and other child elements to be positioned without specifying a specific cell position. For example, a child element without a position attribute can be automatically positioned in the next empty cell. One skilled in the art will also appreciate that the updating of layout attributes can be performed under the control of a computer program. In such a case, the separation of content from layout of a user interface element can simplify the updating. Accordingly, the invention is not limited except as by the appended claims.

We claim:

1. A method in a computing device for specifying alternate layouts of an element of a display description specified using a display description language, the method comprising:

providing a display description file that specifies the display description using the display description language that includes:

a definition of the element, the definition of the element occurring only once in the display description file;

a first condition and a first layout for the definition of the element; and a second condition and a second layout for the definition of the element; and when processing the definition of the element of the provided display description file, parsing by the computing device the display description file to identify the definition of the element, the first condition and the first layout, and the second condition and the second layout;

retrieving a parameter for controlling the layout of the element;

determining whether the retrieved parameter indicates that the first condition is satisfied or the second condition is satisfied;

displaying the element in accordance with the first layout when it is determined that the first condition is satisfied; and displaying the element in accordance with the second layout when it is determined that the second condition is satisfied;

wherein layouts and conditions included in the same display description file only specify how to display elements defined in the display description file, wherein the element has child elements and the layouts specify the layout of the child elements, wherein a layout specifies a table in which the child elements are to be displayed, and wherein the layout that specifies the table further specifies that a cell within the table for a child element and another cell for another child element is to be automatically selected.

2. The method of claim 1 wherein the element has a class and the conditions and layouts are provided in a style for that class.

3. The method of claim 2 wherein the conditions and layouts are attributes of an element for that class.

4. The method of claim 1 wherein the conditions and layouts are provided as attributes within the definition of the element.

5. The method of claim 1 wherein a layout is from a group consisting of vertical layout, horizontal layout, vertical flow layout, and horizontal flow layout.

6. The method of claim 1 wherein the display description language is XML based.

7. The method of claim 1 wherein the display description language is HTML based.

8. A method performed by a computing device with a storage device and a display for specifying alternate layouts of an element of a display description specified using a display description language, the method comprising:

providing in the storage device a display description file that specifies the display description using the display description language that includes:

a definition of the element, wherein the element has child elements, the definition of the element occurring only once in the display description file;

a first condition and a first layout for the definition of the element; and a second condition and a second layout for the definition of the element, wherein the layouts specify the layout of the child elements and wherein a layout specifies a table in which the child elements are to be displayed and further specifies a cell within the table for a child element and another cell for another child element is to be automatically selected; and when processing by the computing device the definition of the element of the provided display description file, parsing by the computing device the display description file to identify the definition of the element, the first condition and the first layout, and the second condition and the second layout;

retrieving a parameter for controlling the layout of the element;

determining whether the retrieved parameter indicates that the first condition is satisfied or the second condition is satisfied;

displaying on the display the element in accordance with the first layout when the first condition is satisfied; and displaying on the display the element in accordance with the second layout when the second condition is satisfied;

wherein layouts and conditions included in the display description file only specify how to display elements defined in the display description file.

9. A computer system for specifying alternate layouts of an element of a display description specified using a display description language, the computer system including a processor and a storage device, the processor is configured to:

provide in the storage device a display description file that specifies the display description using the display description language that includes:

a definition of the element, wherein the element has child elements, the definition of the element occurring only once in the display description file;

a first condition and a first layout for the definition of the element; and a second condition and a second layout for the definition of the element, wherein the layouts specify the layout of the child elements and wherein a layout specifies a table in which the child elements are to be displayed and further specifies a cell within the table for a child element and another cell for another child element is to be automatically selected; and the processor when executing the definition of the element of the provided display description file, parsing by the computing device the display description file to identify the definition of the element, the first condition and the first layout, and the second condition and the second layout;

retrieving a parameter for controlling the layout of the element;

determining whether the retrieved parameter indicates that the first condition is satisfied or the second condition is satisfied;

displaying on the display the element in accordance with the first layout when the first condition is satisfied; and displaying on the display the element in accordance with the second layout when the second condition is satisfied;

wherein layouts and conditions included in the display description file only specify how to display elements defined in the display description file.

10. The computer system of claim 9 wherein the element has a class and the condition and layout pairs are specified in a style for that class.

11. The computer system of claim 10 wherein the condition and layout pairs are attributes of an element for that class.

12. The computer system of claim 9 wherein the condition and layout pairs are attributes within the definition of the element.

13. The computer system of claim 9 wherein a layout is from a group consisting of vertical layout, horizontal layout, vertical flow layout, and horizontal flow layout.

14. A computer-readable storage medium storing computer instructions, the computer instructions when executed by a computer performs a method for specifying alternate layouts of an element using a display description language, the method comprising:

providing a display description file that specifies the display description using the display description language that includes:

a definition of the element, the definition of the element occurring only once in the display description file;

a first condition and a first layout for the definition of the element; and a second condition and a second layout for the definition of the element; and when processing the definition of the element of the provided display description file, parsing by the computing device the display description file to identify the definition of the element, the first condition and the first layout, and the second condition and the second layout;

retrieving a parameter for controlling the layout of the element;

determining whether the retrieved parameter indicates that the first condition is satisfied or the second condition is satisfied;

displaying the element in accordance with the first layout when it is determined that the first condition is satisfied; and displaying the element in accordance with the second layout when it is determined that the second condition is satisfied;

wherein layouts and conditions included in the same display description file only specify how to display elements defined in the display description file, wherein the element has child elements and the layouts specify the layout of the child elements, wherein a layout specifies a table in which the child elements are to be displayed, and wherein the layout that specifies the table further specifies that a cell within the table for a child element and another cell for another child element is to be automatically selected.

15. The computer-readable storage medium of claim 14 wherein the conditions and layouts are defined in a style associated with the element.

16. The computer-readable storage medium of claim 15 wherein the style is associated with the element based on a class.

17. The computer-readable storage medium of claim 14 wherein the conditions and layouts are defined as attributes of the element.

18. The computer-readable storage medium of claim 14 wherein the data structure is specified using XML.

19. The computer-readable storage medium of claim 14 wherein the data structure is specified using HTML.

* * * * *